United States Patent
Sugimori et al.

[11] Patent Number: 5,225,910
[45] Date of Patent: Jul. 6, 1993

[54] ADAPTIVE OPERATION TYPE LOW NOISE TELEVISION SYSTEM

[75] Inventors: Yoshio Sugimori, Tokyo; Toshiya Ito, Saitama, both of Japan; Yves C. Faroudja, 26595 Anacapa Dr., Los Altos Hills, Calif. 94022

[73] Assignees: Nippon Television Network Corporation, Tokyo, Japan; Yves Faroudja, Los Altos Hills, Calif.

[21] Appl. No.: 615,700

[22] Filed: Nov. 20, 1990

[51] Int. Cl.⁵ .................................. H04N 5/208
[52] U.S. Cl. ........................ 358/167; 358/166; 358/340
[58] Field of Search ............. 358/167, 166, 36, 37, 358/39, 340, 315, 11; 455/43

[56] References Cited

U.S. PATENT DOCUMENTS

| | | | |
|---|---|---|---|
| 3,286,024 | 11/1966 | Melchior | 455/43 |
| 3,333,055 | 7/1967 | Krause | 358/167 |
| 3,517,314 | 6/1970 | Miyagi | 455/43 |
| 3,518,566 | 6/1970 | Vogel | 455/43 |
| 4,607,285 | 8/1986 | Hirota | 358/36 |
| 4,658,295 | 4/1987 | Beech | 455/43 |
| 4,779,133 | 10/1988 | Sugimori et al. | 358/167 |
| 4,918,515 | 4/1990 | Faroudja | 358/11 |
| 5,016,104 | 5/1991 | Lim | 358/330 |
| 5,025,312 | 6/1991 | Faroudja | 358/167 |
| 5,027,210 | 6/1991 | Beech | 358/167 |

FOREIGN PATENT DOCUMENTS 277031 11/1989 Japan .................................. 455/43

Primary Examiner—Tommy P. Chiu
Attorney, Agent, or Firm—Wegner, Cantor, Mueller & Player

[57] ABSTRACT

A cooperative adaptive low noise television system provides that, prior to transmission, the composite video is separated into chroma and luminance components. The luminance signal is adaptively pre-emphasized, with the amount of pre-emphasis being determined by the luminance transitions level, so that small transitions have more pre-emphasis than large ones. In the receiver, a received luminence signal is submitted to adaptive deemphasis in order to precisely cancel the adaptive pre-emphasis provided prior to transmission, thus reducing transmission noise while restituting a luminance signal free of pre-shoot, over-shoot or resolution losses.

4 Claims, 3 Drawing Sheets

ADAPTIVE OPERATION TYPE LOW NOISE TELEVISION SYSTEM

BACKGROUND OF THE INVENTION

This invention relates to a low noise television system having means for suppressing increase of noise as maintaining improved picture quality in television broadcast transmission and reception.

U.S. Pat. No. 4,779,133 discloses a television system of amplitude modulation (AM) type which uses a technique as follows for the purpose of utilizing a transmission bandwidth of a luminance signal to the greatest extent and suppressing noise in a video signal produced in a receiver. In the transmission side, a frequency characteristic of the luminance signal to be transmitted is controlled so that it varies continuously between a flat frequency characteristic and a predetermined preemphasis frequency characteristic depending upon a low frequency component in the luminance signal. In the reception side, the received luminance signal is controlled with a frequency characteristic which varies continuously between the flat frequency characteristic and a deemphasis frequency characteristic which is opposite to the abovementioned preemphasis one depending upon the low frequency component in the received luminance signal, to obtain a luminance signal for image display.

This prior art technique has enabled to transmit a signal having a preemphasis effect even in the AM television system. More particularly, a maximum preemphasis is applied in the transmission side to a portion of the luminance signal including a little low frequency component, namely, exhibiting a small amplitude, while almost no preemphasis is applied to a portion of the signal including a big low frequency component, namely, exhibiting a large amplitude. This results in a preemphasis effect as preventing occurrence of overmodulation. Moreover, a signal treated by using this technique has a compatibility to a classic receiver having no function regarding deemphasis and it generally raises definition of a displayed image and improves quality of the image in the receiver.

Although, when the abovementioned signal treatment is effected in the transmission side, a desired effect is obtained in most of the image, it may result in overshoot and undershoot having some extent of magnitude and a waveform determined in accordance with a preemphasis constant, as shown in FIG. 6, in a portion in the displayed image in which an amount of change of the level of waveform (hereinunder referred to as "transient") of the luminance signal is large. Such overshoot and undershoot are originally unwanted. The treated luminance signal waveform in this portion has a chance for resulting in instantaneous overmodulation of the receiver exceeding a desired upper threshold of signal level, though it is a matter of course that the excessive amount of the signal level is very little as compared with the case where only a simple preemphasis is effected without use of the abovementioned technique. In addition to the excess of the signal waveform level, a contour of the displayed image in this portion may be excessively emphasized to appear strange.

SUMMARY OF THE INVENTION

Accordingly, an object of this invention is to provide an improved television system which enables the abovementioned signal treatment as disclosed in the above cited reference with no unwanted overshoot and undershoot occurring in the portion of the displayed image in which the luminance signal level exhibits a large change.

According to this invention, there is provided a low-noise television system composed of broadcast transmitter and receiver. The transmitter is adapted to control the amount of preemphasis applied by a preemphasis circuit in accordance with the magnitude of the low frequency component in the luminance signal and the receiver is adapted to similarly control the amount of deemphasis applied by a deemphasis circuit in accordance with the magnitude of the low frequency component in the luminance signal in the received signal to obtain a luminance signal for image display. The transmitter includes means for disabling or bypassing the preemphasis circuit to transmit a non emphasized luminance signal in accordance with the magnitude of transient in the luminance signal only when the magnitude exceeds a predetermined value, and the receiver includes means for successively (adaptively) processing the received signal with a flat characteristic only when the magnitude of transient in the received luminance signal exceeds a predetermined value and, otherwise, with a characteristic of deemphasis to obtain a luminance signal for image display.

In the transmitter, the amount of preemphasis applied to the luminance signal component of a color video signal provided by a television camera or the like is controlled in accordance with the values of the low frequency component and transient included in the luminance signal in the system of this invention, while it has been controlled in accordance with the value of the low frequency component in the prior art system. More particularly, the luminance signal component of the color video signal is divided into three channels. In the first channel, the luminance signal is carried out to obtain a first signal without applying any change of the characteristic. In the second channel, the luminance signal is subjected to the transmitter process as disclosed in the cited reference to obtain a second signal. In the third channel, a mixing ratio L of the first and second signals is calculated based upon the component of transient included in the luminance signal. Here, the value of L is unity when the amplitude of transient is between zero and a certain value (e.g., PP=40%), while it decreases to zero above this value, as shown in FIG. 3. The first and second signals are combined in the following fashion to provide a third signal to be transmitted.

$$(\text{1st signal}) \times (1-L) + (\text{2nd signal}) \times L = \text{3rd signal}$$

In the receiver, the luminance signal (third signal) in the received television signal is also divided into three channels. In the first channel, the third signal is carried out without application of any change of characteristic to obtain a fourth signal. In the second channel, the third signal is subjected to the receiver process as disclosed in the cited reference to obtain a fifth signal. In the third channel, the value of L is calculated based upon the transient component of the third signal. Then, the fourth and fifth signals are combined in the following fashion to obtain a sixth signal.

$$(\text{4th signal}) \times (1-L) + (\text{5th signal}) \times L = \text{6th signal}$$

The sixth signal is used as a luminance signal for image display.

As described above, according to this invention, the preemphasis operation in the transmitter and the deemphasis operation in the receiver are executed as same as in the prior art system as disclosed in the cited reference when the value of the transient component in the luminance signal is below a specific value, while these operations are interrupted when the value of transient exceeds the specific value.

These and other objects and features of this invention will be described in more detail below with reference to the accompanying drawings.

DESCRIPTION OF PREFERRED EMBODIMENTS

Figure 1:
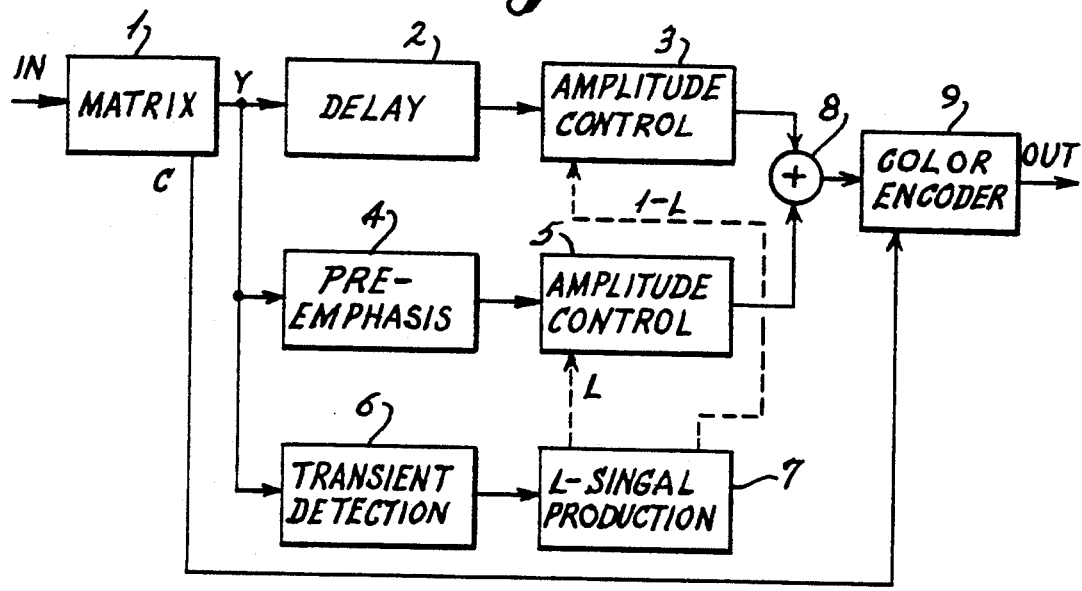
FIG. 1 is a block diagram of a luminance signal processing unit of a transmitter in an embodiment of this invention.
Figure 3:
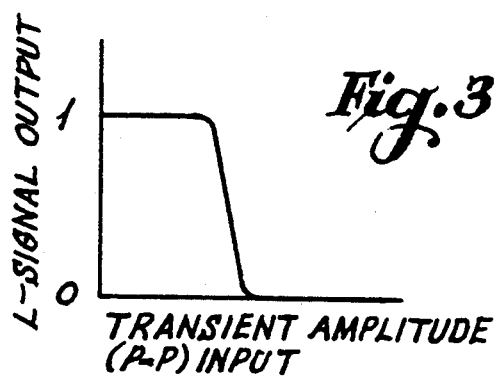
FIG. 3 is a diagram showing an input/output characteristic of an L-component producing circuit in FIG. 1.

Referring to FIG. 1 showing a video signal processing unit of the transmitter, a signal provided by a camera or the like enters a matrix circuit 1 which separates it into a liminance component Y and a chrominance component C. One part of the luminance component Y passes a delay circuit 2 and enters an amplitude control circuit 3. Another part of the component Y passes a preemphasis circuit 4 and enters another amplitude control circuit 5. The preemphasis circuit 4 is the circuit which has been proposed by the aforementioned U.S. patent for effecting adaptive operation in accordance with a value of low frequency component included in the luminance signal. A further part of the luminance component Y passes a transient detecting circuit 6 and enters an L-component producing circuit 7. The L-component producing circuit 7 is an amplifier having a non-linear input/output characteristic for producing L and (1−L) outputs in accordance with the magnitude of the detected transient. In this characteristic, for example, the value of L is unity when the transient amplitude (P-P) is below 40%. However, it gradually decreases when the transient amplitude is above 40%, and becomes zero when the latter is above 60%, as shown in FIG. 3.

Figure 4:
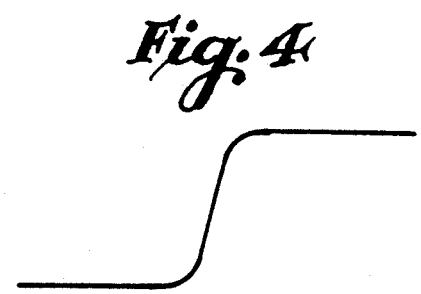
FIG. 4 is a diagram showing an output waveform of a circuit 1 in FIG. 1.
Figure 5:
FIG. 5 is a diagram showing a waveform of a high frequency component included in a signal of the circuit 1.
Figure 6:
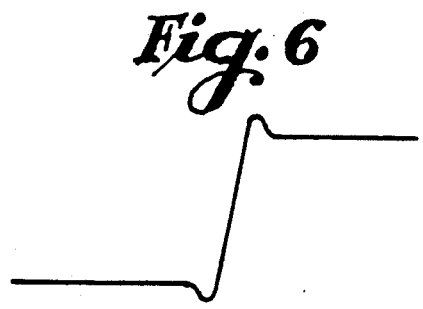
FIG. 6 is a diagram showing an output waveform of a circuit 4 of FIG. 1.
Figure 7:
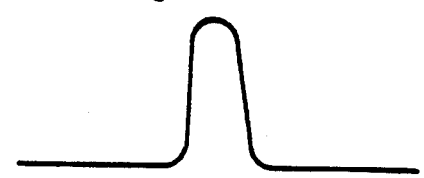
FIG. 7 is a diagram showing an output waveform corresponding to the magnitude of transient provided by the circuit 6.
Figure 8:
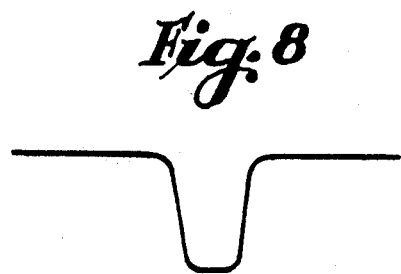
FIG. 8 is a diagram showing a waveform of an L-signal at an output of a circuit 7 of FIG. 1.
Figure 9:
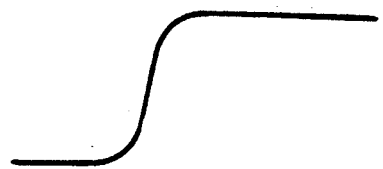
FIG. 9 is a diagram showing an output waveform of a circuit 8 of FIG. 1.

The outputs of both amplitude control circuits 3 and 5 are summed in an adder 8 whose output is applied to a color encoder 9. The mixing ratio of the adder 8 is determined in accordance with the control signals (1−L) and L provided by the L component producing circuit 7. FIG. 4 shows a waveform of part of the output luminance signal Y of the matrix circuit 1 including a large transient component. FIG. 5 shows a high frequency component included in this signal. This component is a signal within a frequency range to be subjected to preemphasis of the circuit 4. FIG. 6 shows an output waveform of the circuit 4, which exhibits a large transient and an emphasized high frequency component. As shown, it includes substantial amounts of overshoot and undershoot. FIG. 7 shows a detection output of the circuit 6, which is proportional to the amount of transient. FIG. 8 shows an output waveform of the circuit 7, which shows that the output becomes zero only when the input signal is greater than a predetermined value. FIG. 9 shows an output waveform of the adder 8, which shows that a signal having no overshoot and undershoot can be obtained in the range including a large transient by using the signal which passed the circuit 2. This means that overmodulation of the output signal of the color encoder 9 is prevented even when its waveform includes a large transient. When the amount of transient is not large, the circuit 4 operates to ensure the effect of the invention as disclosed in the aforementioned U.S. patent.

Figure 2:
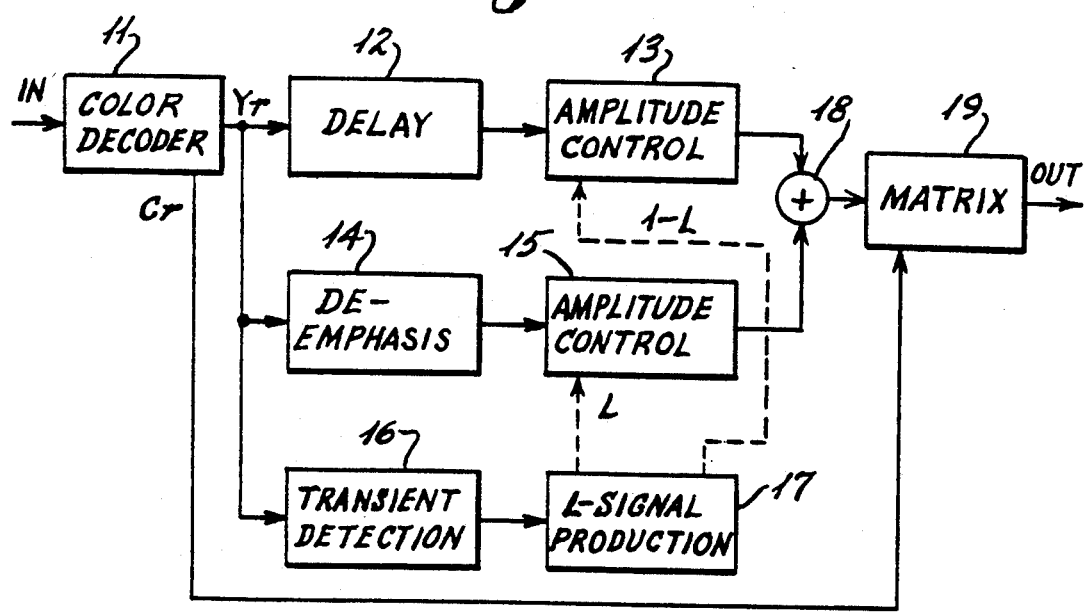
FIG. 2 is a block diagram of a luminance signal processing unit of a receiver in the same embodiment.

FIG. 2 shows a luminance signal processing unit of the receiver corresponding to the transmitter unit as shown in FIG. 1. A received color video signal enters a color decoder 11 in which it is separated into luminance and chrominance components Yr and Cr. One part of the luminance signal component Yr passes a delay circuit 12 and enters an amplitude control circuit 13. Another part of the luminance signal component Yr passes a deemphasis circuit 14 and enters another amplitude control circuit 15. The circuit 14 is the circuit which is proposed in the aforementioned U.S. patent for effecting an adaptive operation in accordance with the value of a low frequency component. A further part of the luminance signal component Yr passes a transient detecting circuit 16 and enters an L-component producing circuit 17. The L component producing circuit 17 is an amplifier having non-linear input/output characteristic, which is arranged to obtain L and (1−L) outputs in accordance with the magnitude of transient. This characteristic is assumed to be the same as the characteristic of the abovementioned L-component producing circuit 7 in the transmitter.

According to a concept of this invention, the luminance signal is processed in the transmitter so that no preemphasis is effected when it includes a large transient. Therefore, the luminance signal component Yr obtained by processing a received signal in the color decoder 11 is a signal subjected to no preemphasis only when it includes a large transient. In this case, there is naturally no need of applying preemphasis to the signal. Since the L signal provided by the circuit 17 in the receiver is zero only in this case (where a large transient is included), the input signal of an adder 18 is only the signal passing the circuits 12 and 13. When the transient is not large, however, the input signal of the adder 18 is the signal passing the circuits 14 and 15. Accordingly, deemphasis is applied in the receiver to the part of signal waveform to which preemphasis has been applied in accordance with the control in the transmitter, while unnecessary deemphasis is not applied in the receiver to the part of signal waveform to which no preemphasis has been applied in the transmitter. Thus, a synthetic system of preemphasis and deemphasis which exhibits a high fidelity is completed.

As described above, according to this invention, the effect of the invention of the aforementioned U.S. patent in that the high frequency region of the luminance signal is preemphasized in accordance with the amplitude of the low frequency component in the transmitter and then corresponding deemphasis is applied thereto in the receiver, thereby preventing overmodulation and suppressing noises is also available in the part of waveform of the signal provided by a camera or the like in the transmitter side. In other words, the effect of the invention of the above U.S. patent is exhibited to any waveform. Moreover, compatibility with a conventional receiver having no deemphasis function is also attained since, when such broadcast is received by such receiver, even an improvement in fineness is obtained without any sense of incompatibility appearing in the displayed image inclusive of the part of luminance signal including a large transient.

Figure 10:
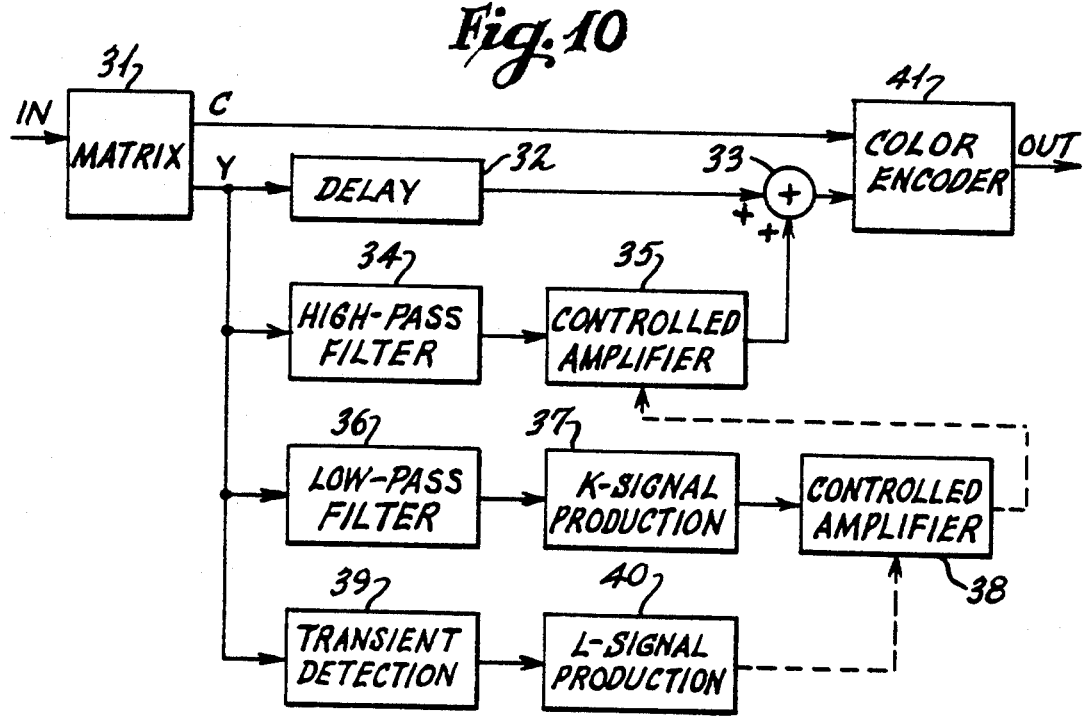
FIG. 10 is a block diagram of a luminance signal processing unit of a transmitter in another embodiment of this invention.

FIG. 10 shows a luminance signal processing unit in the transmitter constructed in accordance with another embodiment of this invention. One part of a luminance signal component Y obtained from a matrix circuit 31 passes a delay circuit 32 and enters an adder 33. Another part of the luminance signal Y passes a highpass filter 34 and enters a controlled amplifier 35. The highpass filter 34 is provided for obtaining a predetermined preemphasis characteristic. A further part of the luminance signal Y passes a lowpass filter 36 and enters a K-component producing circuit 37. The K-component producing circuit 37 is arranged to provide a K-component having a small value when the low frequency component of the luminance signal obtained from the lowpass filter 36 is large, but having a large value when the value of the low frequency component of the luminance signal is small, as in the K-component producing circuit disclosed in the above cited U.S. patent. The output signal of the K-component producing circuit enters another controlled amplifier 38.

A further part of the luminance signal Y enters a transient detecting circuit 39. The transient detecting circuit 39 delivers a transient component in the luminance signal to an L-component producing circuit 40. The L-component producing circuit 40 produces an L signal having a value of unity when the detected transient component is less than a predetermined value and having a value of zero when the transient component exceeds the predetermined value, as same as in the L component producing circuit 7 of the first embodiment.

Since the controlled amplifier 38 is controlled by the value of L provided by the L component producing circuit 40, the output of the amplifier 38 is suppressed only when the value of the transient in the luminance signal exceeds a predetermined value. Since the controlled amplifier 35 is controlled by the output of the controlled amplifier 38, the output of the amplifier 35 is synthetically maximum when the value of the low frequency component of the luminance signal is small and minimum when the low frequency component of the luminance signal is large, and it becomes also minimum when the value of the transient of the luminance signal exceeds a predetermined value.

The input of the controlled amplifier 35 is a high frequency component in the luminance signal, namely, the signal component used for preemphasis. The preemphasis component of the output of the controlled amplifier 35 is added to the component of luminance signal from the delay circuit 32 which has a flat characteristic in an adder 33. The output of the adder 33 is a luminance signal which has been subjected to maximum preemphasis when the luminance signal includes little low frequency component (dark) and minimum preemphasis when it includes much low frequency component (bright), and also subjected to minimum preemphasis when the transient in the luminance signal exceeds a predetermined value. This signal is applied to a color coder 41 for use in transmission.

Figure 11:
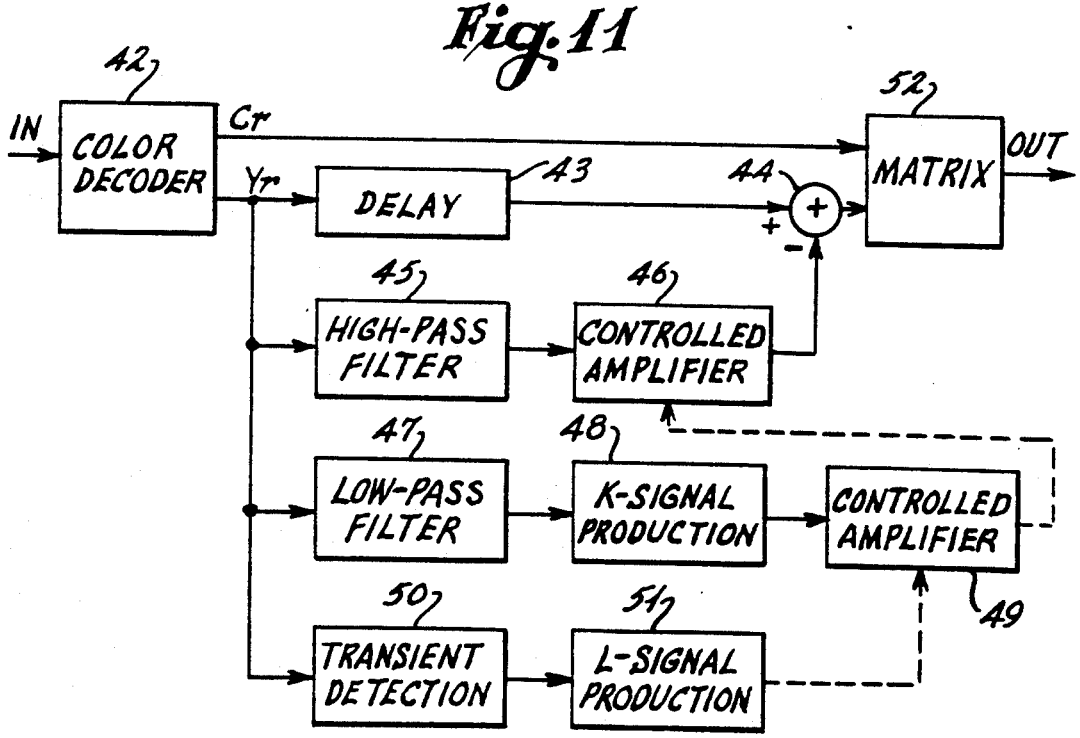
FIG. 11 is a block diagram of a luminance signal processing unit of a receiver in the same embodiment.

FIG. 11 shows a luminance signal processing unit in the receiver corresponding to the abovementioned transmitter unit of FIG. 10. No description will be made on the circuit configuration and operation of this unit since they are exactly the same as those of the processing unit of FIG. 10 except that the polarity of the output signal (from 49) applied to the controlled amplifier 46 is inverted. Since the output of the controlled amplifier 46 is same as the output of the controlled amplifier 35 of FIG. 10, such an operation of inverting the polarity of this output and adding it to a signal obtained from a delay circuit 43 is nothing but the deemphasis operation. Since this deemphasis operation is same as that in the transmitter with respect to the magnitude of the low frequency component in the luminance signal and the magnitude of the transient, the processing of the luminance signal is completely complimentary in both transmitter and receiver. Thus, the second embodiment can provide a generally same effect as the first embodiment.

The above description of the embodiments has been made for the illustrative purpose only and never intends any limitation to the scope of the invention. It should be obvious to those skilled in the art that various modifications and changes can be added to these embodiments without leaving the spirit and scope of the invention as defined in the appended claims.

We claim:

1. In a low noise television system comprising broadcast transmitter and receiver, said transmitter having a preemphasis circuit for preemphasizing a first luminance signal of a video signal according to a magnitude of a low frequency component of said first luminance signal so as to provide a transmitted video signal having a second luminance signal which is dependent upon the characteristics of the first luminance signal, and said receiver including a deemphasis circuit for deemphasising said second luminance signal, upon reception or said transmitted video signal, according to a magnitude of a low frequency component of said second luminance signal, the improvement comprising:

means for controlling an amount of said preemphasizing according to a magnitude of transient in said first luminance signal; and means for controlling an amount of said deemphasizing according to a magnitude of transient in said second luminence signal.

2. The improvement as in claim 1, and wherein:

said preemphasizing control means comprises means for disabling said preemphasis circuit, when said transient magnitude of said first luminance signal exceeds a predetermined value, in order to transmit a third luminence signal which is not preemphasized; and said deemphasizing control means comprises means for processing said second luminence signal with a flat characteristic when said transient magnitude of said second luminence signal exceeds an other predetermined value and for processing said second luminence signal with a deemphasis characteristic when said transient magnitude of said second luminence signal equals or is less than said other predetermined value.

3. The improvement as in claim 1, wherein:

said preemphasizing control means comprises means for detecting said transient magnitude in said first luminance signal and providing a detection signal, first amplitude control means for controlling an output of said preemphasis circuit, second amplitude control means for controlling an amplitude of said first luminance signal, with said preemphasis circuit output and said first luminance signal amplitude being controlled in mutually opposite senses according to said detection signal, and means for mixing outputs of said first and second amplitude control means at a predetermined ratio; and said deemphasizing control means comprises means for detecting said transient magnitude in said second luminance signal and providing an other detection signal, third amplitude control means for controlling an output amplitude of said deemphasis circuit, fourth amplitude control means for controlling a current amplitude of said second luminence signal, with said deemphasis circuit output and said second luminance signal amplitude being controlled in mutually opposite senses according to said other detection signal, and means for mixing outputs of said third and fourth amplitude control means at a predetermined ratio.

4. The improvement as in claim 1, wherein:

said preemphasis circuit comprises means for detecting a magnitude of said low frequency component in said first luminance signal and providing a measurement signal indicative thereof, means for controlling an amplitude of a high frequency component of said first luminance signal according to said measurement signal, means for summing outputs of said high frequency amplitude control means and a current value of said first luminance signal;

said preemphasizing control means comprises means for detecting said transient magnitude in said first luminence signal in order to provide a detection signal, and means for controlling a magnitude of said measurement signal;

said deemphasis circuit comprises means for detecting a magnitude of said low frequency component of said second luminance signal and providing an other measurement signal indicative thereof, means for controlling an amplitude of a high frequency component of said second luminance signal according to said other measurement signal, means for subtracting an output of said high frequency amplitude control means from a current value of said second luminence signal;

said deemphasizing control means comprising means for detecting said transient magnitude in said second luminence signal and providing an other detection signal, and means for controlling a magnitude of said other measurement signal according to said other detection signal.

* * * * *